UNITED STATES PATENT OFFICE.

JOSEPH T. SLUSHER, OF SABETHA, KANSAS.

VETERINARY MEDICINE.

1,074,655. Specification of Letters Patent. Patented Oct. 7, 1913.

No Drawing. Application filed January 27, 1912. Serial No. 673,777.

*To all whom it may concern:*

Be it known that I, JOSEPH T. SLUSHER, a citizen of the United States of America, residing at Sabetha, in the county of Nemaha and State of Kansas, have invented new and useful Improvements in Veterinary Medicines, of which the following is a specification.

This invention relates to a compound for arresting or preventing menstruation in female animals, particularly mares, mare mules, sows, cows, heifers, etc., the object being to provide a compound for such purpose which may be used when necessity requires in the medical or surgical treatment of such animals or to enable animals being fed for the block to be fattened more rapidly and at less expense for food.

The compound consists of the following constitutents combined in or about the stated proportions, to wit:

Indigo _____ 16 ozs.
Sodium chlorid (common salt) _ 6 ozs.
Linseed meal _____ 10 ozs.

These ingredients are thoroughly pulverized and mixed, and a suitable proportion may be administered to the animal under treatment in the ordinary food or in any other suitable manner. The compound has been found valuable in treating certain diseases where the menstrual flow should be checked or stopped, and in restoring to health animals having abnormal sexual desire. It is also of value in treating animals being fattened for the block, in which case it entirely stops the flow, in enabling them to be fattened in less time and at less expense for food than under the ordinary fattening process.

This compound is preferably given to mares and mare mules as follows: One tablespoonful each day for three successive days. Repeat after 21 days and again after 42 days. For large, strong, young mules the dose may be increased to double the amount stated. For cows, the same treatment, except that the dose is increased one fourth. For sows, use the same treatment as for mules, but the dose is only about one third as much.

Having thus described my invention, I claim:

1. A medical compound for the purpose described comprising indigo, sodium chlorid and linseed meal.

2. A medicinal compound for decreasing or preventing menstruation, consisting of indigo, about 16 ounces; chlorid of sodium, about 6 ounces; linseed meal, about 10 ounces.

In testimony whereof I have affixed my signature in presence of two witnesses.

JOSEPH T. SLUSHER.

Witnesses:
W. R. GUILD,
ROY MISHLER.

Copies of this patent may be obtained for five cents each, by addressing the "Commissioner of Patents, Washington, D. C."